United States Patent
Bauer et al.

(10) Patent No.: US 9,632,007 B2
(45) Date of Patent: Apr. 25, 2017

(54) METHOD FOR DAMPING VIBRATIONS WHILE TESTING A DRIVETRAIN HAVING AT LEAST ONE SHAFT

(71) Applicant: KRISTL, SEIBT & CO. GESELLSCHAFT M.B.H., Graz (AT)

(72) Inventors: Robert Bauer, Graz (AT); Marcus Lang, Graz (AT); Bernd Pressl, Graz (AT); Wilfried Rossegger, Graz (AT); Franz Voit, Gleisdorf (AT)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 297 days.

(21) Appl. No.: 14/382,490

(22) PCT Filed: Mar. 1, 2013

(86) PCT No.: PCT/AT2013/050052
§ 371 (c)(1),
(2) Date: Sep. 2, 2014

(87) PCT Pub. No.: WO2013/126940
PCT Pub. Date: Sep. 6, 2013

(65) Prior Publication Data
US 2015/0107347 A1    Apr. 23, 2015

(30) Foreign Application Priority Data
Mar. 1, 2012  (AT) .................................. 50048/2012

(51) Int. Cl.
*G01M 17/10* (2006.01)
*G01M 13/02* (2006.01)

(52) U.S. Cl.
CPC ................................. *G01M 13/025* (2013.01)

(58) Field of Classification Search
USPC ................ 73/115.01, 115.05, 115.06, 115.07
See application file for complete search history.

(56) References Cited

U.S. PATENT DOCUMENTS

| | | |
|---|---|---|
| 4,468,958 A | 9/1984 | Takeshita |
| 5,078,008 A | 1/1992 | Yagi et al. |

(Continued)

FOREIGN PATENT DOCUMENTS

| | | |
|---|---|---|
| AT | 010301 U2 | 12/2008 |
| DE | 3808524 A1 | 9/1989 |

(Continued)

OTHER PUBLICATIONS

International Preliminary Report on Patentability mailed Sep. 4, 2014; PCT/AT/2013/050052.

(Continued)

*Primary Examiner* — Eric S McCall
(74) *Attorney, Agent, or Firm* — Ladas & Parry LLP

(57) ABSTRACT

The invention relates to a method for damping vibrations while checking a drivetrain which has at least one shaft and to a device for carrying out the method. The shaft is connected to at least one drive or load machine for adjustment of a drive or load torque, a target value of the drive or load torque being specified for the machine. A shaft torque which is dependent on the relative rotation between two points on the shaft is measured, and the measured shaft torque as such is applied to the target value of the drive or load torque.

9 Claims, 3 Drawing Sheets

(56) References Cited

U.S. PATENT DOCUMENTS

| | | | | |
|---|---|---|---|---|
| 5,438,882 A | * | 8/1995 | Karim-Panahi | G01H 1/10 73/650 |
| 8,689,640 B2 | * | 4/2014 | Bauer | G01M 1/10 73/760 |
| 2003/0177846 A1 | * | 9/2003 | Tamagawa | G01L 3/02 73/862.29 |
| 2008/0319684 A1 | * | 12/2008 | Parrish | G01L 3/109 702/43 |
| 2011/0238359 A1 | | 9/2011 | Kokal et al. | |
| 2013/0098147 A1 | * | 4/2013 | Bauer | G01M 1/10 73/118.01 |
| 2016/0010494 A1 | * | 1/2016 | Erlund | G01M 15/14 60/773 |

FOREIGN PATENT DOCUMENTS

| | | |
|---|---|---|
| DE | 10247347 A1 | 5/2003 |
| EP | 1333268 A2 | 8/2003 |
| WO | 2011/022746 A1 | 3/2011 |

OTHER PUBLICATIONS

Austrian Office Action Appln. No. 20048/2012; Dated Nov. 26, 2012.

* cited by examiner

METHOD FOR DAMPING VIBRATIONS WHILE TESTING A DRIVETRAIN HAVING AT LEAST ONE SHAFT

FIELD OF THE INVENTION

The invention relates to a method for damping vibrations while testing a drivetrain having at least one shaft, which shaft is connected to at least one drive or load machine for adjusting a drive or load torque, a target value of the drive or load torque being specified for said machine, wherein a shaft torque is measured, which is dependent on the relative twist between two points on said shaft.

DESCRIPTION OF THE PRIOR ART

In a drivetrain test stand, it is usually not possible to connect the component to be tested (hereinafter referred to as device under test, DUT) to the same environment as in operation. For example, in a test stand a combustion engine will be connected to a load machine via a relatively rigid shaft instead of contacting the road via a softer drivetrain and tires. This usually results in poorly damped (and therefore pronounced) resonance frequencies in the test stand, which the DUT will not encounter in operation. If the DUT triggers these resonance frequencies, the resulting vibrations may massively influence the test result and may even destroy the DUT and/or the test stand. Therefore, measures to damp these resonance frequencies are necessary in the test stand. The known methods are mentioned below. For the sake of simplicity, the examples are based on a test stand having only one shaft and one load machine, but all the methods may also be applied to test stands equipped with multiple shafts and drive and/or load machines.

Resonance frequencies may be primarily reduced and in addition also damped to a larger extent by using a softer, more effectively damped coupling shaft. The problem is thus solved if the DUT no longer triggers resonance frequencies in normal operation (e.g. because the idle speed of a combustion engine corresponds to a higher frequency). However, the low-pass effect of the soft coupling shaft is a disadvantage, in addition, quite some power may be used up by friction in the shaft (heating and sometimes even destroying the shaft), and finally, this method offers no solution for DUTs still triggering resonance frequencies in normal operation.

Alternatively, methods for active damping are already known, wherein an additional torque is added to the load machine, corresponding to a shaft damping. Actually, it would be necessary to know the angular speed difference of the shaft (see e.g. DE 38 08 524), although this speed difference may be estimated on the basis of the measured shaft torque (see EP 1 333 268 A2): The measured shaft torque is differentiated, weighted with a correction factor and added to the torque target value of the load machine (e.g. from a speed control output) as a correction value. However, differentiating a measured value has the disadvantage that the measurement noise, which is always present, will be strongly amplified. The differentiated torque could be filtered using a low-pass filter, but this would render the method unstable at higher resonance frequencies so that its application in practice is substantially limited.

U.S. Pat. No. 5,078,008 A describes a control device as state of the art, wherein a load machine torque is controlled with respect to a target value and a measured shaft torque. However, it does not mention the relationship between the target value and the measured shaft torque.

DE 102 47 347 A1 presents a system for torque control supposedly avoiding resonances at high speeds by robust control, wherein a torque controller receives the difference between the axial target torque and the axial torque detected and output by the device. The difference thus obtained is not given as such (i.e. directly) to a drive or load machine, but rather a transfer function implementing a µ synthesis procedure adapted to the engine testing system is applied to said difference.

U.S. Pat. No. 4,468,958 A presents a test stand wherein a drivetrain shaft is connected to a torque measuring device, wherein a computer compares the measured torque signal with a reference torque signal. However, this document does not mention how the control signal output by the computer is derived from the measured torque signal and the reference torque signal.

Further, AT 010 301 U2 teaches a method wherein measured data are stored over a working cycle (e.g. 720° crank angle in a four stroke cycle engine) and used for predicting future target values for better damping resonance frequencies. However, as the damping effect will only be realized in future working cycles, this method only works in steady-state, and it is therefore problematic to use it in practice for transient tests. Moreover, a not insignificant amount of effort is required to store the measurement data in the controller.

Finally, U.S. Pat. No. 8,006,548 B2 teaches a robust control, wherein controllers are designed based on an exact mathematical model of the test stand, which will suitably control the test stand even if parameters slightly vary. However, a test stand is prone to strong parameter variations during operation, and usually not much is known about the DUT. In practice, test stand operators cannot be expected to design a fitting robust controller for each new DUT.

SUMMARY OF THE INVENTION

The problem solved by the present invention is to provide a method as mentioned above and a device for carrying out said method, which uses a simple control not affected by measurement noise, achieves the desired damping effect even in transient tests—particularly in first-time tests of DUTs—and does not require knowledge of any DUT or test stand parameters.

In order to solve this problem, the invention provides a method as mentioned above, characterized in that the measured shaft torque as such (i.e. directly and without changing its absolute value) is combined with the target value of the drive or load torque. Preferably, the measured shaft torque is directly, i.e. particularly without using any intermediate differentiating member, added to the target value of the drive or load torque.

Correspondingly, in the device according to the present invention as mentioned above, the measuring unit for measuring the shaft torque is directly connected to the unit for determining the drive or load torque target value, so that the measured shaft torque as such may be added to the drive or load torque target value.

Thus, ideally, when the target value is zero, the shaft torque is added to the load machine in an exactly opposite fashion. Thus, the total torque for the load machine is zero, and the rotation speed remains constant. Thus, a perfectly constant rotation speed control is obtained, although the speed may also be changed by using a target value other than zero. Consequently, the load machine acts on the DUT like an infinitely large moment of inertia, which would not be expected to have any damping effect—on the contrary, the larger moment of inertia is actually supposed to worsen test stand conditions. Even for an expert in the field it is not obvious that the method according to the present invention has excellent damping effects in practice, and this effect will be demonstrated below by means of a technical system analysis.

In particular, the present approach differs from the prior art methods in that it does not require differentiation of any measured value. Consequently, the advantages are that this method is significantly simpler than the state of the art methods, and it is also robust against measurement noise.

A more detailed examination reveals that the measured shaft torque is appropriately linked to the drive or load torque target value via a delay line free from (i.e. without) any differentiating member. Preferably, the delay line is designed such that a suitable damping effect of resonance frequencies is achieved.

Moreover, the measured shaft torque is advantageously modified by a frequency-dependent first-order transfer function $$G(s) = \frac{M_2(s)}{M_W(s)} = \frac{1}{\tau s + 1}$$

before being added to the drive or load torque target value. Damping of resonance frequencies may be suitably described and thus optimized using this transfer function.

Preferably, the method according to the present invention is designed such that the delay between the measured shaft torque and the resulting reaction on the drive or load torque is in the range of milliseconds, preferably less than about 20 ms, particularly 1-10 ms. A delay within said range will achieve optimum damping of resonance frequencies.

With respect to the achieved damping effect, the method may be improved in that the measured shaft torque is multiplied with a constant weighting factor and subsequently added to the drive or load torque target value. This has the advantage that using said weighting factor a ("continuous") adjustment of the damping effect may be achieved.

In order to control the rotation speed of the shaft, the measured shaft torque is preferably linked to a preset target torque of a controller, in particular of a rotation speed controller. Thus, the method according to the present invention may advantageously be used for testing different, where required varying rotation speeds.

Hereinafter, the present invention will be explained in greater detail using particularly preferred embodiments, to which the invention is not restricted, however, and with reference to the drawings.

DETAILED DESCRIPTION OF THE PREFERRED EMBODIMENTS

Figure 1:
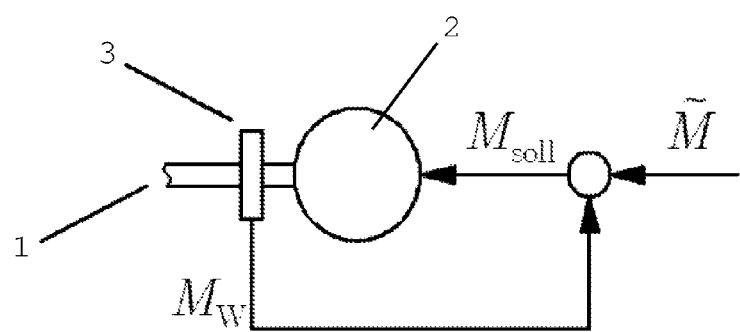
FIG. 1 is a schematic representation of a section of a test stand assembly with a device according to the present invention.

FIG. 1 shows the method according to the present invention using a partially schematic representation of the components involved. The DUT (not shown) is connected to load machine 2 via shaft 1. The torque of load machine 2 is specified as a target value. On shaft 1 a torque measurement 3 is performed, and the result of this measurement 3 is combined/added as such to the drive or load torque target value. Consequently, the target of load machine 2 corresponds to the sum of (or, in case of reversed signs, the difference between) the original target value and the measured torque. In case the target value of the drive or load torque is zero, any torque measured on shaft 1 will be compensated by load machine 2, and the rotation speed will remain constant. The fact that a torque on shaft 1 will not change the rotation speed means that load machine 2 appears to have an infinitely large moment of inertia. This would, however, not result in damping but only in a shift of the resonance frequencies of the test stand.

Only a more detailed examination will reveal that the method according to the present invention does achieve the desired damping effect. For the sake of simplicity, this examination is carried out here for a test stand having one shaft 1. Of course, the method may also be applied to test stands having multiple shafts and drive and/or load machines.

Figure 2:
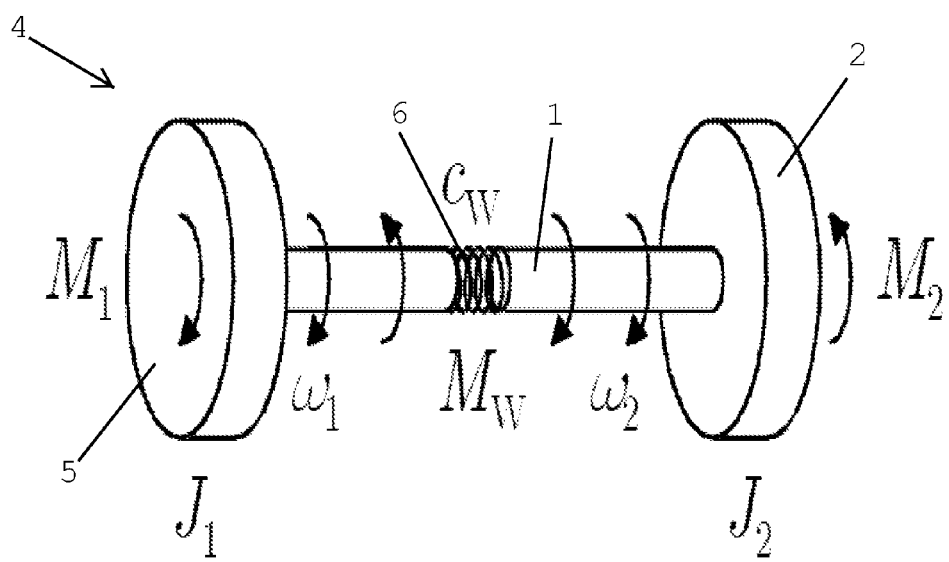
FIG. 2 is a model of a test stand assembly with a shaft.

FIG. 2 shows a model of a test stand assembly 4 equipped with a shaft 1. Said shaft 1 connects a DUT 5 to a load machine 2. Said DUT 5 has a moment of inertia $J_1$, provides torque $M_1$, and rotates at an angular speed $\omega_1$. Load machine 2 has a moment of inertia $J_2$, provides torque $M_2$, and rotates at an angular speed $\omega_2$. The equations according to the law of conservation of angular momentum are $$J_1 \frac{d\omega_1}{dt} = M_1 - M_W$$

$$J_2 \frac{d\omega_2}{dt} = M_W - M_2$$

wherein, for the sake of simplicity (without damping the shaft), the shaft torque $M_W$ is $$M_W = C_W(\phi_1 - \phi_2)$$

wherein $C_W$ is the spring rigidity of shaft 1 and $\phi_1 - \phi_2$ is the angular difference between DUT 5 and load machine 2. The spring 6 indicated in the center of shaft 1 serves to illustrate the finite torsional rigidity of shaft 1.

Figure 3:
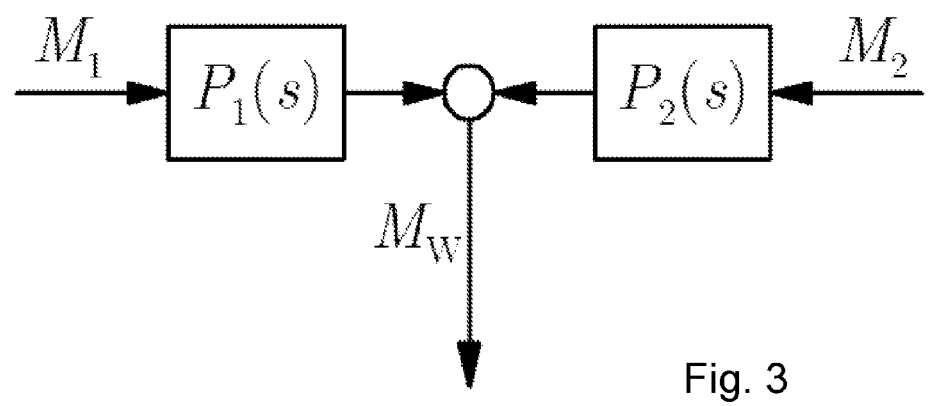
FIG. 3 is a schematic model according to FIG. 2 without any active damping measures.

FIG. 3 shows a model of the correlation between the torques at DUT 5 ($M_1$), at load machine 2 ($M_2$), and at shaft 1 ($M_W$) from a systems engineering perspective. The correlations of the torques in the illustrated case without active damping measures are described by the following transfer functions $P_1$ and $P_2$.

$$P_1(s) = \frac{M_W(s)}{M_1(s)} = \frac{\frac{c_W}{J_1}}{s^2 + \left(\frac{c_W}{J_1} + \frac{c_W}{J_2}\right)}$$

$$P_2(s) = \frac{M_W(s)}{M_2(s)} = \frac{\frac{c_W}{J_2}}{s^2 + \left(\frac{c_W}{J_1} + \frac{c_W}{J_2}\right)}$$

The poles of the two transfer functions are located on the imaginary axis and therefore correspond to an undamped resonance frequency of $$f_0 = \frac{1}{2\pi}\sqrt{\frac{c_W}{J_1} + \frac{c_W}{J_2}}$$

Figure 4:
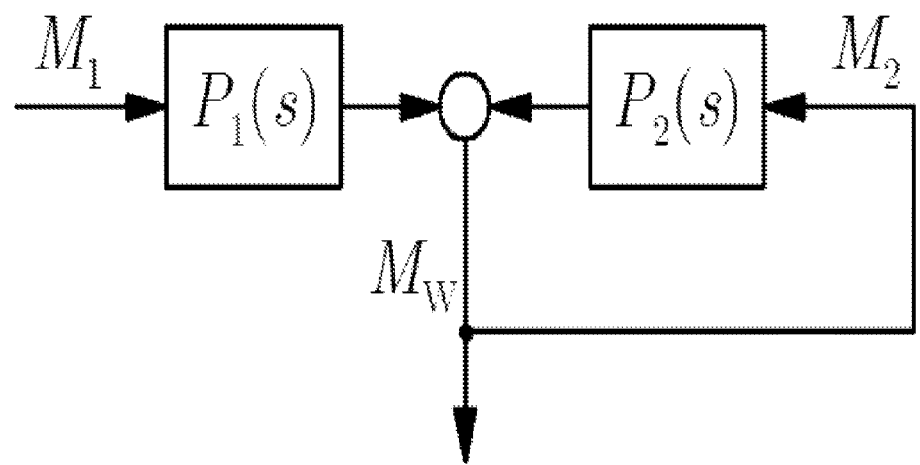
FIG. 4 is a schematic model according to FIG. 2 with an ideal version of the method according to the present invention.

FIG. 4 is obtained by applying the method according to the present invention to the model according to FIG. 3. It turns out, however, that this model does not correspond to real-life conditions. In this figure, as opposed to FIG. 3, the shaft torque $M_W$ is directly added to the load machine as torque $M_2$. This back coupling results in the following "control transfer function":

$$T_{ideal}(s) = \frac{M_W(s)}{M_1(s)} = \frac{P_1(s)}{1 - P_2(s)} = \frac{\frac{c_W}{J_2}}{s^2 + \frac{c_W}{J_1}}$$

Just like the poles of $P_1$ and $P_2$, the poles of $T_{ideal}$ are located on the imaginary axis and correspond to a lower, but still undamped resonance frequency of $$f_0 = \frac{1}{2\pi}\sqrt{\frac{c_W}{J_1}}$$

This shows that no advantage was achieved over the model of FIG. 3 without back coupling.

Figure 5:
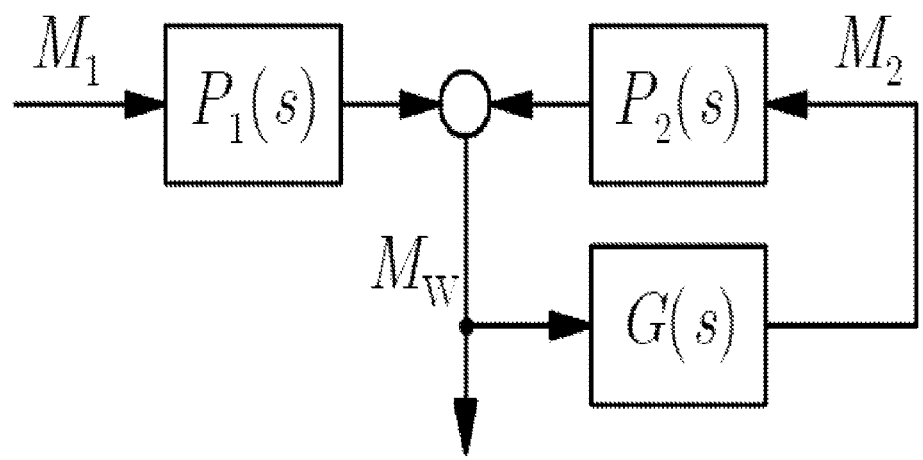
FIG. 5 is a schematic model according to FIG. 2 with the method according to the present invention under realistic conditions.

FIG. 5 shows a model of the method according to the present invention under realistic conditions. As opposed to FIG. 4, it takes into account the fact that, in reality, shaft torque $M_W$ Cannot be directly added to load machine 2 as torque $M_2$. The measurement 3 of the shaft torque and the torque arrangement in load machine 2 result in a delay that cannot be ignored. It is difficult to exactly describe this delay mathematically, but, for the sake of simplicity, the first-order transfer function $$G(s) = \frac{M_2(s)}{M_W(s)} = \frac{1}{\tau s + 1}$$

with time constant $\tau$ may be used for further investigation. This means that under realistic conditions, the originally direct back coupling is modified by a transfer function G. Taking into account the modified back coupling, the "control transfer function" is $$T_{real}(s) = \frac{M_W(s)}{M_1(s)}$$
$$= \frac{P_1(s)}{1 - G(s)P_2(s)}$$

$$= \frac{\tau\frac{c_W}{J_1}s + \frac{c_W}{J_1}}{\tau s^3 + s^2 + \tau\left(\frac{c_W}{J_1} + \frac{c_W}{J_2}\right)s + \frac{c_W}{J_1}}$$

As opposed to $T_{ideal}$, $T_{real}$ obviously has three poles. The exact location of these poles could be calculated, but this will not help understand the damping effect. On the other hand, a control engineering tool proves to be helpful, namely the so-called root locus method. The transfer function of a virtual open circle having polynomials $$L(s) = \tau\frac{Z(s)}{N(s)}$$

$$Z(s) = \left[s^2 + \left(\frac{c_W}{J_1} + \frac{c_W}{J_2}\right)\right]s$$

$$N(s) = s^2 + \frac{c_W}{J_1}$$

results in control transfer function $$T(s) = \frac{L(s)}{1 + L(s)} = \frac{\tau Z(s)}{\tau Z(s) + N(s)}$$

Figure 6:
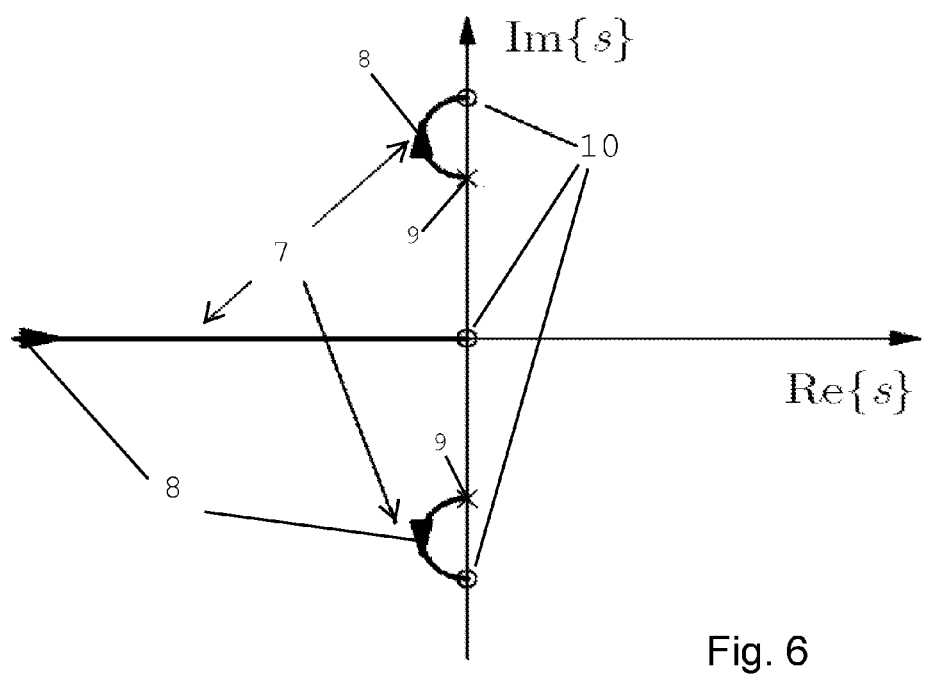
FIG. 6 is a root locus of the control transfer function derived from the model according to FIG. 5 under realistic conditions.

A comparison with $T_{real}$ shows that the two control transfer functions have the same denominator and consequently the same poles, the location of which may therefore easily be described in relation to time constant $\tau$ using the root locus method (see FIG. 6).

FIG. 6 shows the root locus 7 of $T_{real}$. The arrows 8 show the direction in which the poles shift as time constant $\tau$ increases. As $\tau$ increases, the poles determining resonance move on semicircles from the purely imaginary roots of N 9, which correspond to the poles of $T_{ideal}$ to the similarly purely imaginary roots of Z 10, which correspond to the poles of $P_1$ and $P_2$. However, for small time constants $\tau$ the poles of $T_{real}$ move from the virtual axis into the left half plane, which means that there they have a real part other than zero. A real part other than zero corresponds to a damping of the resonance.

In practice, it is neither necessary nor useful to artificially increase time constant $\tau$ because measurement 3 of the shaft torque and the torque arrangement already result in a delay in the range of milliseconds, e.g. about 1-10 ms. A further, artificial delay would reduce the damping effect again, because if time constant $\tau$ is large, the poles tend to get closer to the roots of Z.

The invention claimed is:

1. A method for damping vibrations while testing a drivetrain having at least one shaft,
   which shaft is connected to at least one drive or load machine for adjusting a drive or load torque,
   a reference value of the drive or load torque being specified for said machine,
   wherein a shaft torque is measured which is dependent on the relative twist between two points of said shaft,
   wherein the measured shaft torque is linked to the reference value of the drive or load torque via a delay line free from any differentiating member and added as such to the reference value of the drive or load torque to obtain an input value of the drive or load torque, wherein the at least one drive or load machine is operated at said input value.

2. A method according to claim 1, characterized in that the measured shaft torque is modified by a frequency-dependent first-order transfer function $$G(s) = \frac{M_2(s)}{M_W(s)} = \frac{1}{\tau s + 1}$$

before being added to the reference value of the drive or load torque.

3. A method according to claim 1, characterized in that the measured shaft torque is multiplied with a constant weighting factor and subsequently added to the reference value of the drive or load torque.

4. A device for carrying out the method according to claim 1,
equipped with a drivetrain having at least one shaft, which shaft is connected to at least one drive or load machine for adjusting a drive or load torque on said shaft,
equipped with a unit for determining a drive or load torque target value,
and equipped with a measuring unit for measuring a shaft torque dependent on the relative twist between two points of said shaft,
wherein said measuring unit for measuring the shaft torque is directly connected to the unit for determining the drive or load torque reference value via a delay line free from any differentiating member, so that the measured shaft torque as such may be added to the reference value of the drive or load torque for operating the at least one drive or load machine at said input value.

5. A method according to claim 1, characterized in that the measured shaft torque is linked to a preset reference torque of a controller in order to control the rotation speed of the shaft.

6. A method according to claim 5, wherein the controller is a rotation speed controller.

7. A method according to claim 1, characterized in that a delay between the measured shaft torque and the resulting reaction on the drive or load torque is in the range of milliseconds.

8. A method according to claim 7, characterized in that the delay is less than 20 ms.

9. A method according to claim 7, characterized in that the delay is 1-10 ms.

* * * * *